W. MASON.

Improvement in Wheel-Plows.

No. 131,063. Patented Sep. 3, 1872.

Witnesses:
A. W. Almqvist
C. Sedgwick

Inventor:
W. Mason
per Munn & Co
Attorneys.

UNITED STATES PATENT OFFICE.

WILLIAM MASON, OF MONMOUTH, OREGON.

IMPROVEMENT IN WHEEL-PLOWS.

Specification forming part of Letters Patent No. 131,063, dated September 3, 1872.

Specification describing a new and useful Improvement in Sulky-Plow, invented by WILLIAM MASON, of Monmouth, in the county of Polk and State of Oregon.

Figure 1:
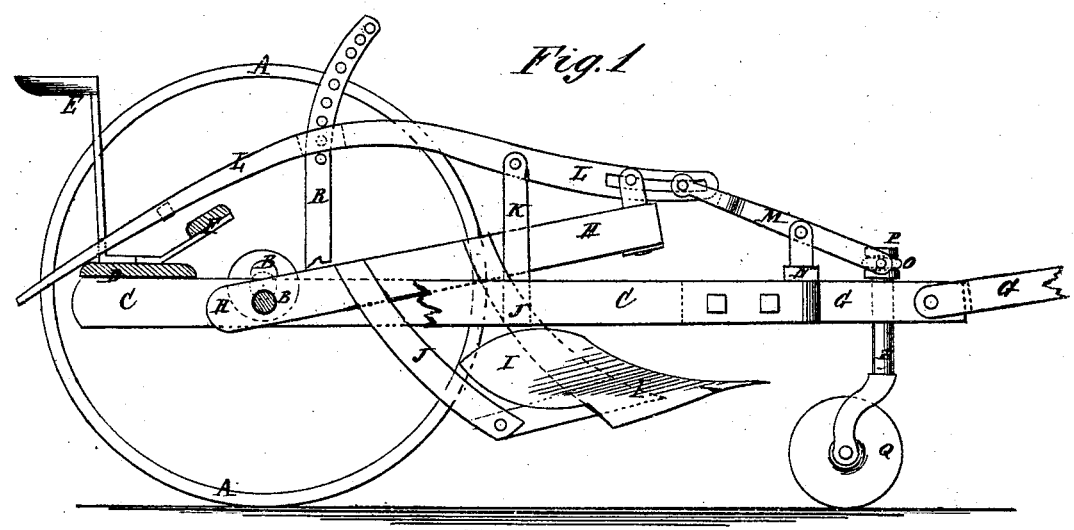
Figure 2:
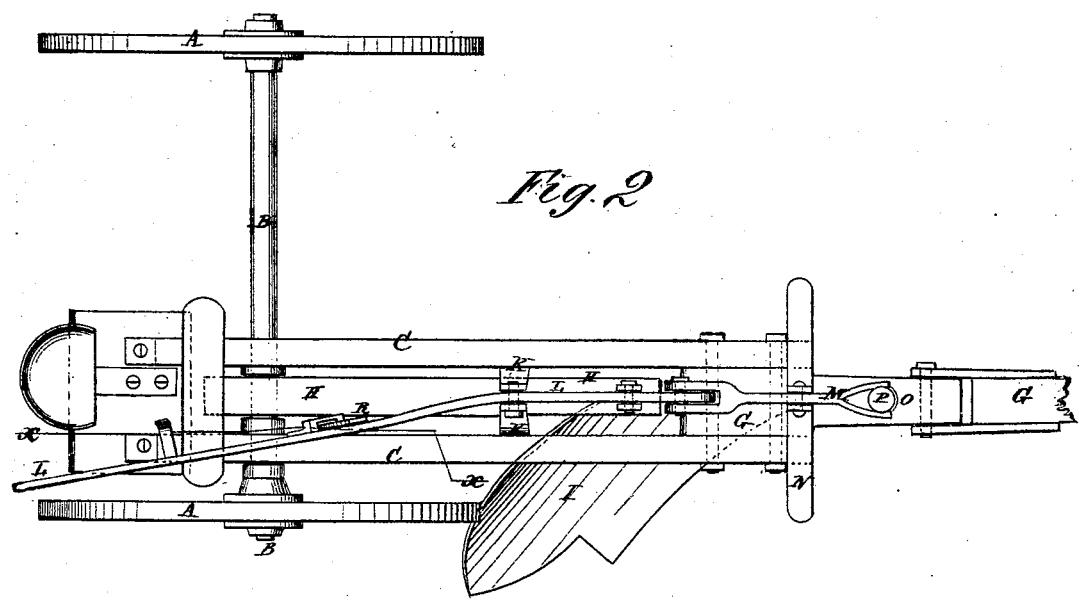

Figure 1 is a side view of my improved sulky-plow partly in section through the line $x\ x$, Fig. 2. Fig. 2 is a top view of the same.

Similar letters of reference indicate corresponding parts.

My invention has for its object to furnish an improved sulky-plow simple in construction, convenient in use, and effective in operation, enabling it to be readily controlled by the plowman; and it consists in the construction and combination of various parts of the plow, as hereinafter more fully described.

A are the wheels, which revolve upon the journals of the axle B. The axle B is bent twice at right angles, or made with a short offset or shoulder at the landside of the frame C, so that the said frame may be level while one wheel is running in the furrow and the other upon the unplowed land. The frame C consists of two bars or beams, through the rear part of which the axle B passes, so that the said frame may be supported by and pivoted to the said axle. The rear ends of the beams C are connected and held in their proper relative positions by the board or platform D, which supports the seat E and the foot-board F. The forward ends of the beams C are attached to the opposite sides of the rear end of the tongue G, which may be made rigid or may be jointed, as may be desired. H is the plow-beam, which is placed between the beams C, and through the rear end of which the axle B passes. I is the plow, the standards J of which are securely attached to the beam H. K is a U-shaped bracket, the ends of the arms of which are attached to the beams C so that the beam H may move up and down within said bracket. To the lugs formed upon the top or bend of the bracket K is pivoted the lever L, the rear end of which extends back into such a position that it may be conveniently reached and operated by the driver from his seat E, and which may have a foot-rest or stirrup attached to it to enable the driver to operate it conveniently with his foot. The forward end of the lever L is slotted longitudinally to receive the bolt by which it is pivoted to an eye-bolt or other support attached to the forward end of the plow-beam H, so that the plow may be raised from the ground or adjusted to work at any desired depth in the ground by simply operating the said lever L. M is a lever, which is pivoted to lugs formed upon the head of the bolt that pivots the double-tree N to the rear part of the tongue G or to the forward end of the frame C. The rear end of the lever M is slotted or forked to receive the forward end of the lever L, the pivoting bolt of said lever M passing through the slot in the said lever L. The forward end of the lever M is forked, and in said fork is pivoted a ring, O, which passes around a neck or groove formed upon the upper end of the standard P, so as to swivel and pivot the said standard to the said lever. The standard P passes down through the rear part of the tongue G, and to its lower end is pivoted a caster-wheel, Q, which supports the forward part of the machine. By this construction, as the lever L is operated to raise and lower the plow-beam and plow, the lever M is also operated to move the forward end of the frame C in the same direction, thus increasing the effect. The rear part of the lever L moves up and down along the side of the curved bar R, with which it is kept in contact by a keeper attached to the said lever L, and through which the said bar R passes. In the bar R are formed numerous holes to receive a pin to secure the lever L into any position into which it may be adjusted.

Having thus described my invention, I claim as new and desire to secure by Letters Patent—

The combination of the U-bracket K, the lever L, lever M, and caster-wheel P Q with the frame C, plow-beam H, and tongue G, substantially as herein shown and described, and for the purpose set forth.

WILLIAM MASON.

Witnesses:
 D. J. HOLMES,
 N. L. BUTLER.